(12) United States Patent
Mogaki

(10) Patent No.: US 11,632,483 B2
(45) Date of Patent: Apr. 18, 2023

(54) MANAGEMENT SYSTEM, INFORMATION PROCESSING APPARATUS, DATA TRANSMISSION DESTINATION PREDICTION METHOD, DATA TRANSMISSION METHOD, AND NON-TRANSITORY COMPUTER-READABLE STORAGE MEDIUM

(71) Applicant: CANON KABUSHIKI KAISHA, Tokyo (JP)

(72) Inventor: Shunsuke Mogaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 422 days.

(21) Appl. No.: 16/833,837

(22) Filed: Mar. 30, 2020

(65) Prior Publication Data
US 2020/0322500 A1    Oct. 8, 2020

(30) Foreign Application Priority Data

Apr. 4, 2019   (JP) .............................. JP2019-072166

(51) Int. Cl.
*H04N 1/32*      (2006.01)
*H04N 1/00*      (2006.01)
*G06N 20/00*     (2019.01)

(52) U.S. Cl.
CPC ......... *H04N 1/32096* (2013.01); *G06N 20/00* (2019.01); *H04N 1/00209* (2013.01); *H04N 1/00214* (2013.01); *H04N 1/00206* (2013.01); *H04N 2201/0094* (2013.01)

(58) Field of Classification Search
None
See application file for complete search history.

(56) References Cited

U.S. PATENT DOCUMENTS

| 8,886,576 B1* | 11/2014 | Sanketi ................. G06N 20/00 706/47 |
| 10,949,434 B1* | 3/2021 | Tirupattur Saravanan ................. G06Q 50/01 |
| 2012/0127490 A1* | 5/2012 | Ogasawara ............. G06F 21/10 726/29 |

(Continued)

FOREIGN PATENT DOCUMENTS

| JP | 5670787 B | 2/2015 |
| JP | 2019200449 A * | 11/2019 |

OTHER PUBLICATIONS

Mori, H, JP-2019200449-A English Translation (Year: 2018).*

*Primary Examiner* — Miya J Williams
(74) *Attorney, Agent, or Firm* — Venable LLP

(57) ABSTRACT

A management system for managing a data transmission destination comprises an accumulation unit configured to accumulate, when data transmission is performed, transmission information of the data transmission as collected data; a generation unit configured to generate training data including a pair of ground truth data containing transmission destination information, and input data containing an item other than the transmission destination information, from the collected data accumulated in the accumulation unit; a processing unit configured to generate, by machine learning, a learning model to be used to predict a transmission destination, by using the training data generated by the generation unit; and a providing unit configured to provide a prediction process using the learning model in response to a request.

8 Claims, 12 Drawing Sheets

(56) References Cited

U.S. PATENT DOCUMENTS

| | | | |
|---|---|---|---|
| 2012/0327465 A1* | 12/2012 | Yamada | G06F 21/45 |
| | | | 358/1.15 |
| 2013/0235413 A1* | 9/2013 | Terao | G06F 3/1238 |
| | | | 358/1.14 |
| 2015/0046976 A1* | 2/2015 | Tonegawa | H04L 63/08 |
| | | | 726/3 |
| 2016/0088191 A1* | 3/2016 | Sasagawa | G06F 3/1285 |
| | | | 358/1.14 |
| 2017/0270430 A1* | 9/2017 | Llagostera | G06N 20/00 |
| 2019/0045069 A1* | 2/2019 | Naito | H04N 1/00795 |
| 2019/0191038 A1* | 6/2019 | Naito | H04N 1/4406 |
| 2020/0412676 A1* | 12/2020 | Kau | H04L 12/1822 |
| 2021/0160382 A1* | 5/2021 | Matsuzawa | H04N 1/00228 |
| 2021/0352190 A1* | 11/2021 | Suzuki | H04N 1/0097 |
| 2021/0390001 A1* | 12/2021 | Walters | G06F 9/543 |

\* cited by examiner

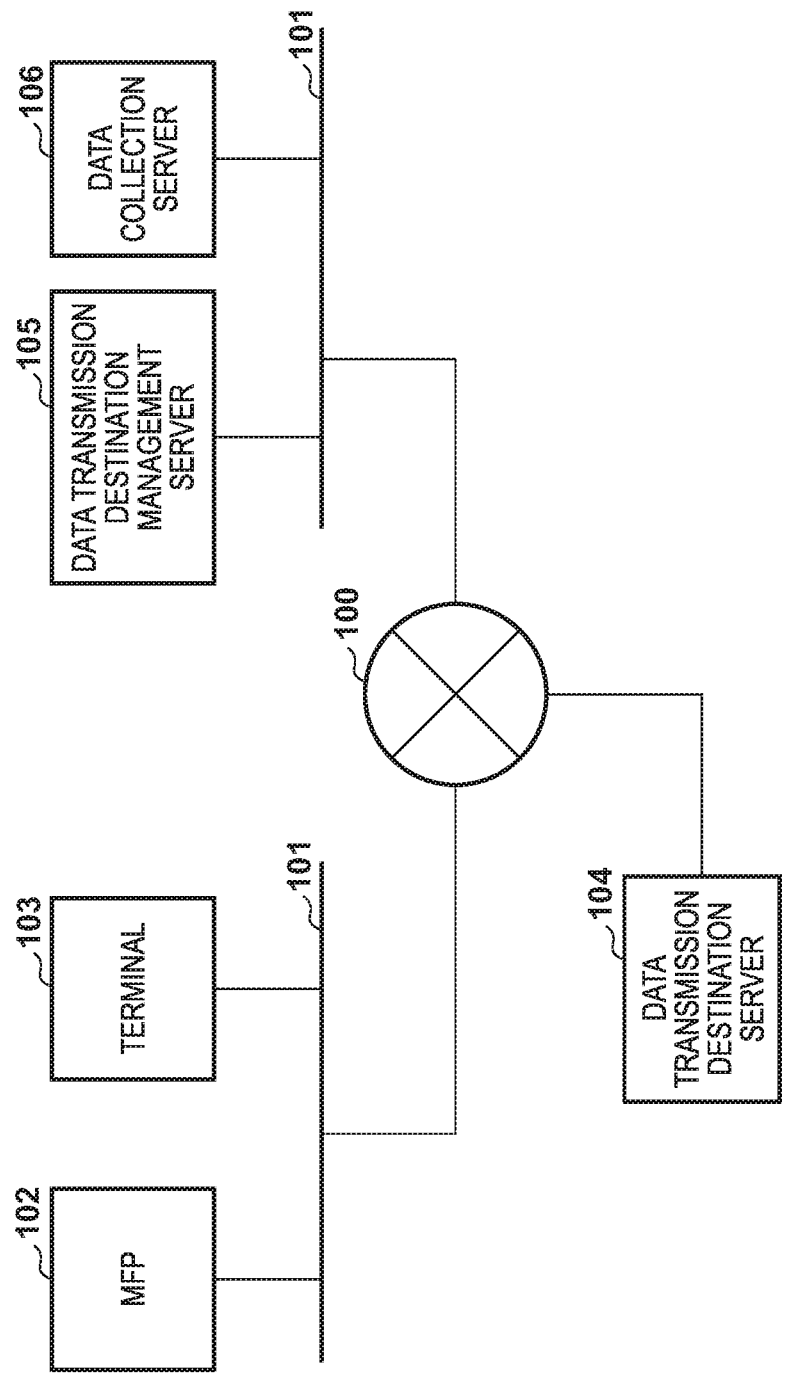

F I G. 7A

| 0 | 0 | 0 | 1 | 1 | 0 | 0 |
|---|---|---|---|---|---|---|
| 0 | 0 | 0 | 1 | 1 | 0 | 0 |
| 2 | 1 | 1 | 2 | 1 | 2 | 1 |
| 3 | 3 | 3 | 3 | 3 | 3 | 3 |
| 3 | 3 | 3 | 3 | 3 | 3 | 3 |
| 0 | 0 | 0 | 1 | 1 | 1 | 1 |
| 1 | 1 | 1 | 1 | 1 | 1 | 1 |

~701

F I G. 7B

| -1 | 0 | 1 |
|---|---|---|
| -2 | 0 | 2 |
| -1 | 0 | 1 |

~702

F I G. 7C

| -1 | 4 | 2 | -3 | -3 |
|---|---|---|---|---|
| -2 | 3 | 1 | -1 | -1 |
| -1 | 1 | 0 | 0 | 0 |
| 0 | 1 | 1 | 0 | 0 |
| 0 | 2 | 1 | 0 | 0 |

~703

F I G. 7D

| 0 | 4 | 2 | 0 | 0 |
|---|---|---|---|---|
| 0 | 3 | 1 | 0 | 0 |
| 0 | 1 | 0 | 0 | 0 |
| 0 | 1 | 1 | 0 | 0 |
| 0 | 2 | 1 | 0 | 0 |

~704

F I G. 7E

| 4 | 2 | 0 |
|---|---|---|
| 1 | 1 | 0 |
| 2 | 1 | 0 |

~705

MANAGEMENT SYSTEM, INFORMATION PROCESSING APPARATUS, DATA TRANSMISSION DESTINATION PREDICTION METHOD, DATA TRANSMISSION METHOD, AND NON-TRANSITORY COMPUTER-READABLE STORAGE MEDIUM

BACKGROUND OF THE INVENTION

Field of the Invention

The present invention relates to a management system, an information processing apparatus, a data transmission destination prediction method, a data transmission method, and a non-transitory computer-readable storage medium.

Description of the Related Art

Recently, deep learning is attracting attention as one machine learning method of causing a computer to learn tasks that humans naturally perform. Deep learning is an important technique playing an important role of supporting the development of artificial intelligence (AI), and more and more practical uses of deep learning are being applied in various fields. In conventional machine learning, a model that performs, for example, classification of data is formed by manually extracting a feature amount of target data and defining the contents of learning by using the extracted feature amount in advance. On the other hand, deep learning forms a model by giving input data and a result of processing such as classification, automatically extracting a feature amount from the data, and automatically learning the processing method. Accordingly, deep learning can obtain a highly accurate result for even a complicated problem that makes it difficult to extract a feature amount by the conventional machine learning.

Also, systems called cloud services that provide software functions across the Internet are becoming popular. The main feature of cloud computing is that requests from many clients are processed in parallel by parallel distributed processing by distributedly executing data conversion and data processing by using many computing resources. For example, an MFP (Multi-Function Printer) is beginning to take a form in which new functions are provided in cooperation with the cloud services. Consequently, pieces of information about user operations, documents, print data, and printer and service logs are accumulated on the cloud services, and this may make it possible to provide new functions by using these pieces of information by machine learning.

For example, Japanese Patent No. 5670787 discloses a technique by which ruled lines, the number of ruled lines, feature points, the number of feature points, color information, and the like in a business form image are accumulated as feature data for each business form type, and the features of an image of a processing target business form are compared with the accumulated feature data, thereby predicting the business form type.

The MFP has various functions, and includes a function of transmitting generated image data to the outside. When transmitting image data from the MFP, a transmission destination must be designated from an operation panel of the MFP. However, it takes labor to input a transmission destination to the operation panel. When regularly transmitting data, therefore, this input labor is conventionally omitted by registering a transmission destination beforehand and designating the registered transmission destination from the operation panel. However, the designation of a data transmission destination still poses problems in convenience, for example, a transmission destination cannot be registered beforehand in some cases, and the registration takes labor.

SUMMARY OF THE INVENTION

The present invention allows the user to designate the address of data transmission more easily.

According to the first aspect of the present invention, a management system for managing a data transmission destination is provided, the system comprising: an accumulation unit configured to accumulate, when data transmission is performed, transmission information of the data transmission as collected data; a generation unit configured to generate training data including a pair of ground truth data containing transmission destination information, and input data containing an item other than the transmission destination information, from the collected data accumulated in the accumulation unit; a processing unit configured to generate, by machine learning, a learning model to be used to predict a transmission destination, by using the training data generated by the generation unit; and a providing unit configured to provide a prediction process using the learning model in response to a request.

According to the second aspect of the present invention, an information processing apparatus is provided, the information processing apparatus comprising: a transmission unit configured to transmit data; a providing unit configured to provide, when the transmission unit performs data transmission, an external apparatus with transmission information of the data transmission as collected data; a prediction unit configured to execute a prediction process of predicting a candidate of a data transmission destination; and a presentation unit configured to present the candidate of the data transmission destination predicted by the prediction unit, wherein the prediction process is performed by using a learning model generated by machine learning performed based on training data generated from collected data accumulated in the external apparatus, the training data including a pair of ground truth data containing transmission destination information, and input data containing an item other than the transmission destination information.

According to the third aspect of the present invention, an information processing apparatus is provided, the apparatus comprising: an obtaining unit configured to obtain data; a transmission unit configured to transmit the data; and a providing unit configured to provide, when the transmission unit performs data transmission, an external apparatus with transmission information of the data transmission as collected data, wherein the collected data is used as training data for generating a learning model to be used to predict a data transmission destination, the training data including a pair of ground truth data containing transmission destination information, and input data containing an item other than the transmission destination information.

Further features of the present invention will become apparent from the following description of exemplary embodiments with reference to the attached drawings.

BRIEF DESCRIPTION OF THE DRAWINGS

FIG. 1 is a view showing a system arrangement example according to one embodiment of the present invention;

FIGS. 7A to 7E are views for explaining data examples according to the convolutional neural network;

DESCRIPTION OF THE EMBODIMENTS

Figure 2A:
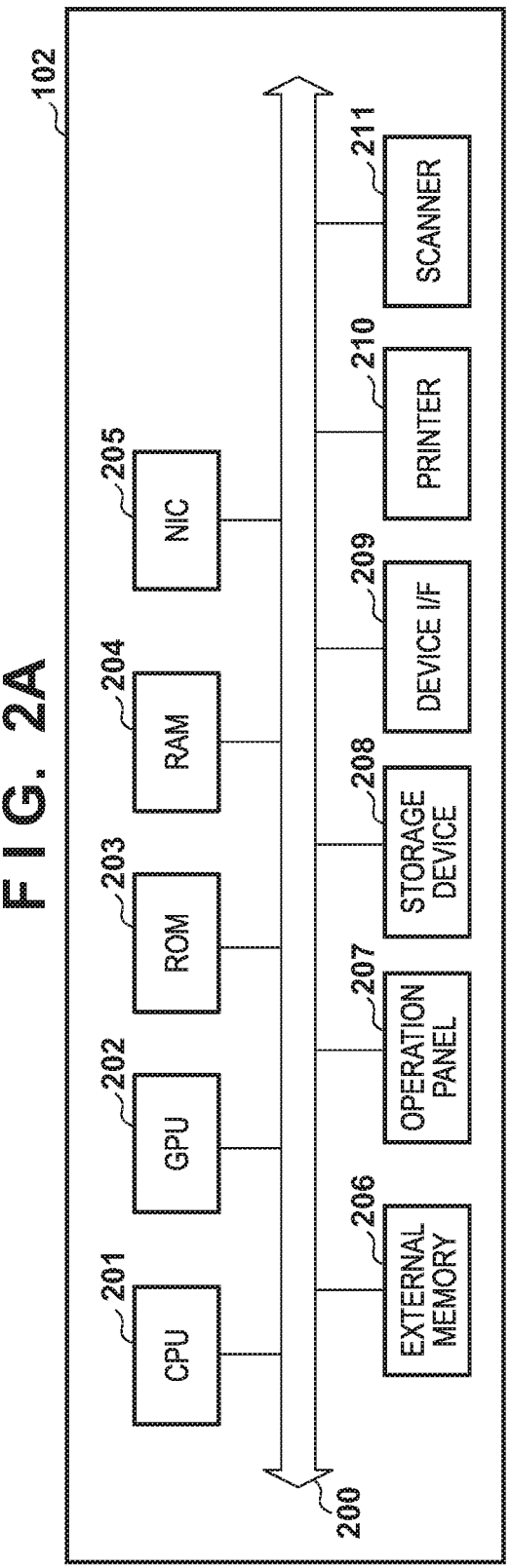
FIGS. 2A and 2B are views showing hardware arrangement examples according to the embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

[Network Arrangement]

FIG. 1 shows a network arrangement example of a network system according to this embodiment. The Internet 100 is an externally connectable public network. An intranet 101 is an externally unconnectable private network such as a LAN (Local area Network). Each apparatus is communicably connected across the Internet 100 and the intranet 101. Note that the connection method is either wired or wireless, and may also be a combination of a plurality of communication methods. Note also that in this embodiment, an MFP as an image formation apparatus is taken as an example of a data transmission apparatus, and information to be transmitted is image data. However, the present invention is not limited to this. For example, data to be transmitted is not limited to image data, and it is also possible to generate character data by reading a predetermined image and transmit this character data.

An MFP 102 can access various servers by accessing the Internet 100 across the intranet 101. The MFP 102 can also transmit various generated data (for example, image data) to a terminal 103 or a data transmission destination server 104 by using mail, HTTP (Hypertext Transfer Protocol) communication, and the like. The terminal 103 is, for example, a PC (Personal Computer) or a portable terminal called a smartphone, and can perform data transmission/reception by using mail and the like.

The data transmission destination server 104 is a server that accepts data from the MFP 102, the terminal 103, and the like. A data transmission destination management server 105 is a server that manages data transmission destination prediction information. The data transmission destination management server 105 performs learning by using data held by a data collection server 106, and manages information obtained by the learning as learned information. The data collection server 106 is a server that saves and provides collected data, and accumulates information obtained when the MFP 102 performs data transmission, as collected data.

The data transmission destination management server 105 and the data collection server 106 can be constructed on the same server (management system), and can also be configured as independent servers. In addition, each server is a single server in this embodiment, but each server may also be disclosed on the Internet as a cloud service made redundant by a plurality of servers. Furthermore, the system can also include a plurality of MFPs 102 and/or a plurality of terminals 103.

[Hardware Arrangement]

Figure 2B:
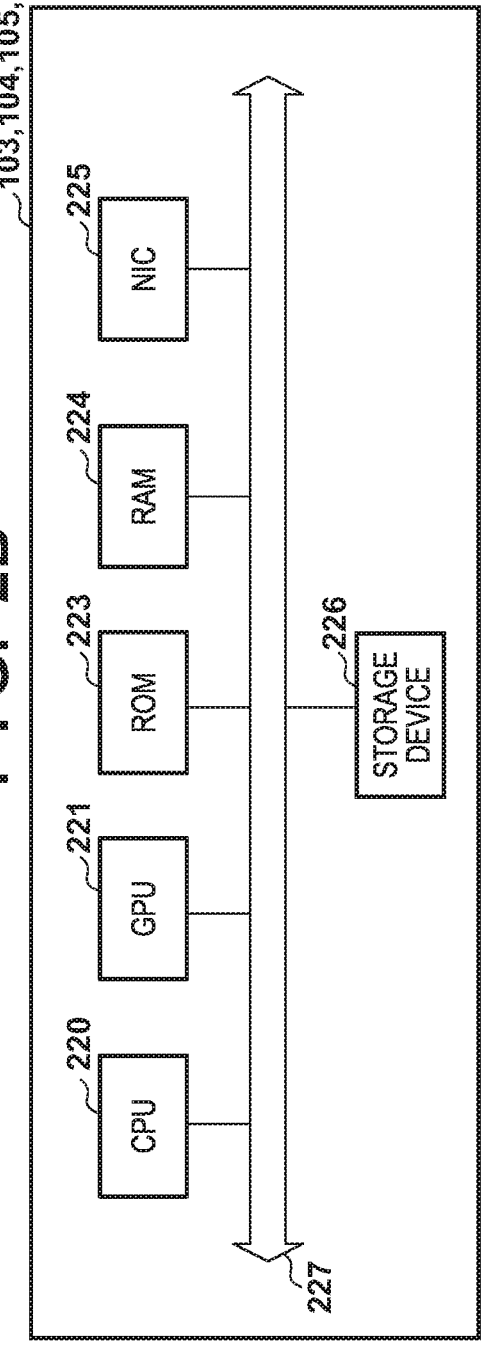

FIGS. 2A and 2B show hardware arrangement examples of the apparatuses according to this embodiment. FIG. 2A shows a hardware arrangement example of the MFP 102 according to this embodiment. Each constituent element of the hardware of the MFP 102 is communicably connected by a system bus 200.

A CPU (Central Processing Unit) 201 is a control device that controls the whole MFP 102, and comprehensively controls access to various devices connected to the system bus 200. This control by the CPU 201 is based on, for example, a control program stored in a ROM 203, or a control program and resource data (resource information) stored in an external memory 206 connected via a disk controller. A GPU (Graphical Processing Unit) 202 is an arithmetic device specialized for vector arithmetic operations of image processing, machine learning, and the like. The ROM (Read Only Memory) 203 is a nonvolatile storage unit, and stores programs such as a basic I/O program, font data to be used in document processing, and various kinds of data such as template data. A RAM (Random Access Memory) 204 functions as a main memory, a work memory, and the like of the CPU 201 and the GPU 202, and is so configured as to increase the memory capacity by an optional memory RAM connected to an expansion port (not shown).

A NIC (Network Interface Card) 205 is an interface for exchanging data with an external apparatus. An operation panel 207 is an operation unit for displaying a screen, and accepting user's operation instructions on the screen. The operation panel 207 also includes buttons and a display unit such as a liquid crystal display for setting the operation mode and the like of the MFP 102, displaying the operation status of the MFP 102, and performing operations such as copy designation. A storage device 208 is an external storage unit that functions as a large-capacity memory, and stores various programs according to the present invention. A device IF 209 is an interface for connecting an external device connectable by a USB (Universal Serial Bus) or the like. A printer 210 is a printing unit using a known printing technique, and preferred examples are an electrophotographic system (a laser beam system), an inkjet system, and a sublimation (thermal transfer) system. The printer 210 performs a printing operation on a printing medium by using image data converted from print data (data having a format such as a PDL (Page Description Language) or a PDF (Portable Document Format)). A scanner 211 is a reading unit using a known image reading technique, and converts an original such as paper placed on a transparent top plate (not shown) into image data by optically scanning the original. The scanner 211 successively reads a plurality of originals placed in an automatic document feeder (an AFD; not shown), and converts the originals into image data. Note that the MFP 102 has the printing function and the scanning function in this embodiment, but may also have another function.

FIG. 2B shows a hardware arrangement example of an information processing apparatus capable of operating as each of the servers (the data transmission destination server 104, the data transmission destination management server 105, and the data collection server 106) and the terminal 103 according to this embodiment. Note that the terminal 103 and each server are not limited to the same hardware arrangement. For example, when the terminal 103 is configured as a portable terminal, the terminal 103 can have another arrangement. Accordingly, the present invention is applicable to a single apparatus or a system including a plurality of apparatuses as long as the functions of the present invention can be executed, unless otherwise specified. In addition, the present invention is applicable to a system in which connection and processing are performed across a network such as a LAN or a WAN (Wide Area Network) as long as the functions of the present invention can be executed, unless otherwise specified. In this embodiment, an explanation will be made by assuming that individual constituent elements are connected by a system bus 227.

A CPU 220 is a control device that controls the whole information processing apparatus, and executes various application programs and an OS (Operating System) stored in a ROM 223 or a storage device 226. The CPU 220 also performs control for temporarily storing information necessary to execute a program, files, and the like in a RAM 224. A GPU 221 is an arithmetic device specialized for vector arithmetic operations of image processing, machine learning, and the like. The ROM 223 is a nonvolatile storage unit and stores programs such as a basic I/O program. The RAM 224 is a temporary storage unit and functions as, for example, a main memory and a work area of the CPU 220 and the GPU 221. A NIC 225 is an interface for exchanging data with an external apparatus. The storage device 226 is an external storage unit and functions as a large-capacity memory. The storage device 226 stores programs according to the present invention, for example, application programs and the OS.

[Software Arrangements]

FIGS. 3A to 3D are views showing module arrangement examples of the various apparatuses according to this embodiment. Note that the modules of the terminal 103 shown in FIG. 3D will be explained in the third embodiment.

Figure 3A:
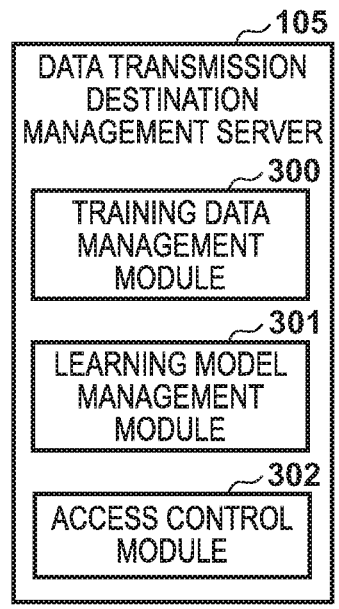
FIGS. 3A to 3D are views showing software arrangement examples according to the embodiment of the present invention.

FIG. 3A shows a software module arrangement example of the data transmission destination management server 105 according to this embodiment. The data transmission destination management server 105 includes a training data management module 300, a learning model management module 301, and an access control module 302. In the hardware arrangement of the information processing apparatus shown in FIG. 2B, each software module is stored in the ROM 223 or the storage device 226, loaded into the RAM 224 by the CPU 220, and executed by the CPU 220 or the GPU 221.

The training data management module 300 obtains collected data from the data collection server 106, converts the collection data into training data to be used in machine learning, and manages the training data. The conversion to training data will be described later. The learning model management module 301 receives training data managed by the training data management module 300, generates a learning model by using machine learning, and manages the learning model. The generation of a learning model will be described later. The access control module 302 registers the MFP 102 and the terminal 103 as clients, and controls access to data. Note that it is also possible to construct the access control module 302 on another server (for example, an access control server (not shown)), and perform access control in cooperation with the other server.

Figure 3B:
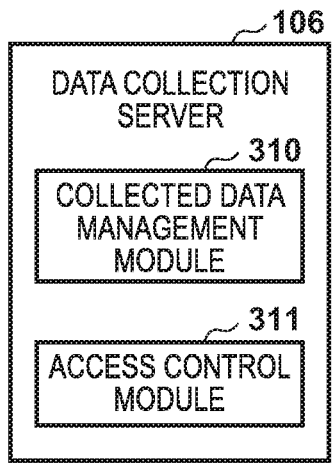
Figure 3D:
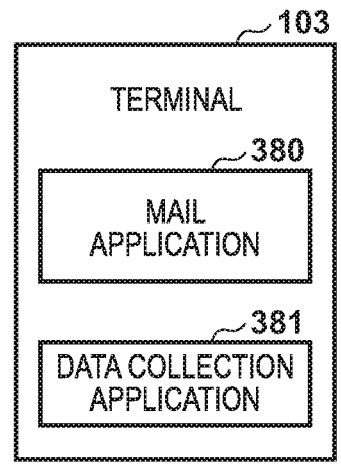

FIG. 3B shows a software module arrangement example of the data collection server 106 according to this embodiment. The data collection server 106 includes a collected data management module 310 and an access control module 311. In the hardware arrangement of the information processing apparatus shown in FIG. 2B, each software module is stored in the ROM 223 or the storage device 226, loaded into the RAM 224 by the CPU 220, and executed by the CPU 220 or the GPU 221.

The collected data management module 310 accepts data from the MFP 102, confirms the validity of the data, and manages the data as collected data. The access control module 311 registers the MFP 102, the terminal 103, and the data transmission destination management server 105 as clients, and controls access to data. Note that it is also possible to construct the access control module 311 on another server (for example, an access control server (not shown)), and perform access control in cooperation with the other server.

Figure 3C:
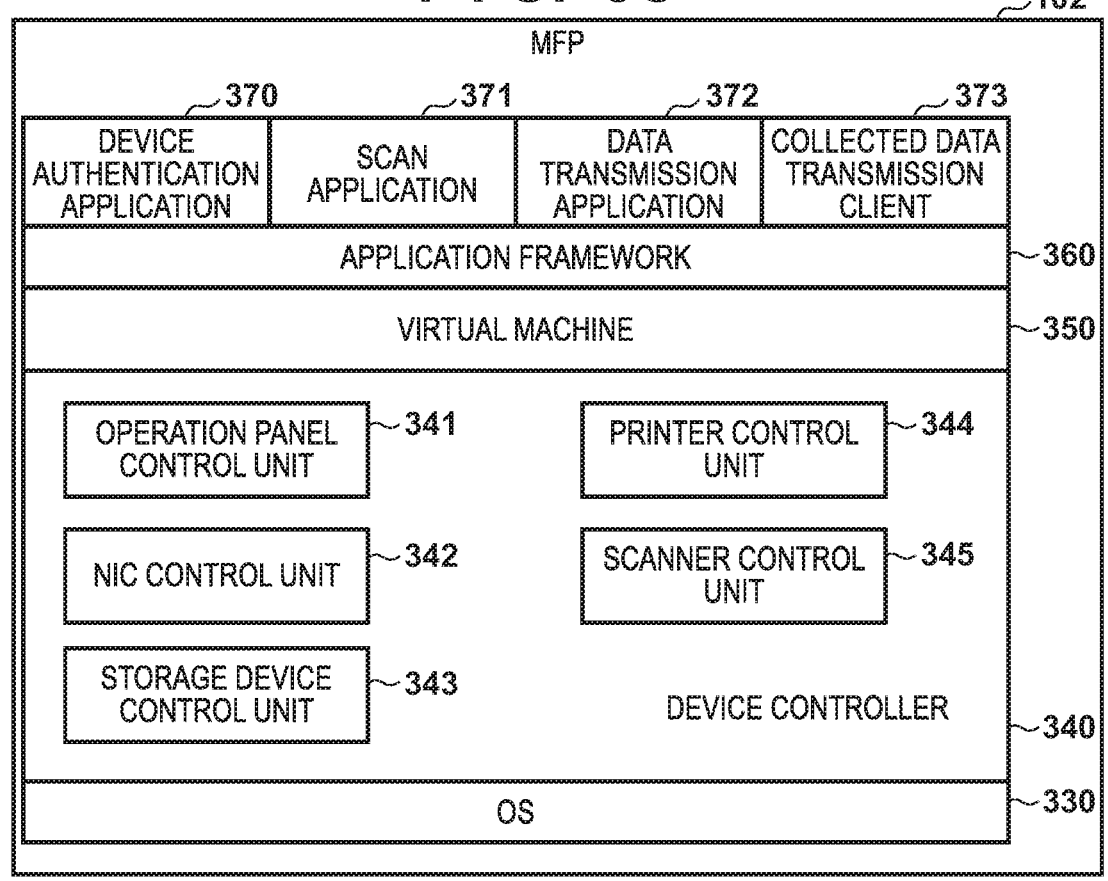

FIG. 3C shows a software module arrangement example of the MFP 102 according to this embodiment. The MFP 102 includes an OS 330, a device controller 340, a plurality of control units to be controlled by the device controller 340, a virtual machine 350, an application framework 360, and a plurality of applications. In the hardware arrangement of the MFP 102 shown in FIG. 2A, each software module is stored in the ROM 203 or the storage device 208, loaded into the RAM 204 by the CPU 201, and executed by the CPU 201 or the GPU 202.

A unique ID (device ID) is issued for each MFP 102, and set in the MFP 102 during production. A real-time OS is generally used as the OS 330, but a general-purpose OS such as Linux® is sometimes used. The device controller 340 controls the various kinds of hardware of the MFP 102 shown in FIG. 2A. The device controller 340 also controls modules (341 to 345) for controlling these hardware components. An operation panel control unit 341 controls screen display on the operation panel 207. A NIC control unit 342 controls a communication protocol such as TCP/IP by using the NIC 205. A storage device control unit 343 is a disk controller for controlling I/O with respect to the storage device 208. A printer control unit 344 converts accepted print data (data having a format such as a PDL or a PDF) into image data, and performs a printing operation by controlling the printer 210. A scanner control unit 345 accepts a scan instruction, and converts an original into read image data by controlling the scanner 211.

An example of the virtual machine 350 is Java® VM (Virtual Machine). The virtual machine 350 is a virtual application execution environment that operates as an application to be controlled by the OS. The application framework 360 has a function of managing the lifecycle of a management target application that operates on the application execution environment provided by the virtual machine 350. In addition, the application framework 360 has a function of disclosing an interface for controlling the lifecycle of an application, and an interface for mediating processing requests between applications. The lifecycle indicates application states including the installation, activation, halt, and uninstallation of an application. Furthermore, the application framework 360 provides an application with an interface for controlling the various kinds of hardware of the MFP 102 via the device controller 340.

Applications operating on the application framework 360 can, for example, receive a printing instruction and a printing result, issue a scan instruction, obtain a scanned image, and display a screen on the operation panel. A device authentication application 370, a scan application 371, a data transmission application 372, and a collected data transmission client 373 are applications that operate on the application framework 360.

The device authentication application 370 is an application for managing login to the MFP 102. The device authentication application 370 displays a login screen on the operation panel 207 of the MFP 102, accepts login (the user name and the password) from the user, and performs user authentication. If the user authentication is successful, the device authentication application 370 stops displaying the login screen, and enables the user to use the various functions of the MFP 102 from the operation panel 207. Examples of the screen arrangement according to this embodiment will be described later with reference to FIGS. 10A to 10C. An application usable without any user authentication may also be set as the device authentication application 370, and in this case the user can use the functions of the application without logging in to it. The device authentication application 370 discloses, on the application framework 360, an interface for obtaining the user ID of the login user of the MFP 102. An application on the application framework 360 can receive a login event or obtain login information via this interface.

The scan application 371 is an application for providing the scan function of the MFP 102. The scan application 371 reads an original by the scanner 211, and generates image data based on the read information. Also, the scan application 371 displays the operation panel 207 and accepts scan setting. On the application framework 360, the scan application 371 discloses an interface for obtaining scan information. An application on the application framework 360 can receive scan start and end events and the like via this interface. Note that from the viewpoint of personal information protection, the scan application 371 can identify character information of scanned information, and delete or mask character information having a predetermined attribute. Targets of character information to be deleted or masked can be only character information found to be personal information such as a name, a mail address, and an address, and can also be all character information. Data to be deleted or masked can change in accordance with, for example, the type of read information. By thus editing character information, it is possible to prevent leakage of personal information contained in scanned image data from the device. It is also possible to reduce the data amount to be transmitted to the outside.

The data transmission application 372 is an application for transmitting image data generated by the MFP 102 to the outside by using e-mail, HTTP communication, or the like. The data transmission application 372 displays the operation panel 207, and accepts data transmission setting such as a data transmission destination. Also, the data transmission application 372 can obtain a transmission destination set for the user authenticated by the device authentication application 370, and transmit data to the transmission destination.

The collected data transmission client 373 detects an event having occurred in the MFP 102, and transmits the event information to the data collection server 106. Examples of the event to be detected by the collected data transmission client 373 are the activation, halt, and sleep events of the MFP 102, user login and logout events, and the start and completion events of a copy job. Note that the collected data transmission client 373 detects an event having occurred in each module of the MFP 102 via the application framework 360.

[Processing Sequences]

Figure 4A:
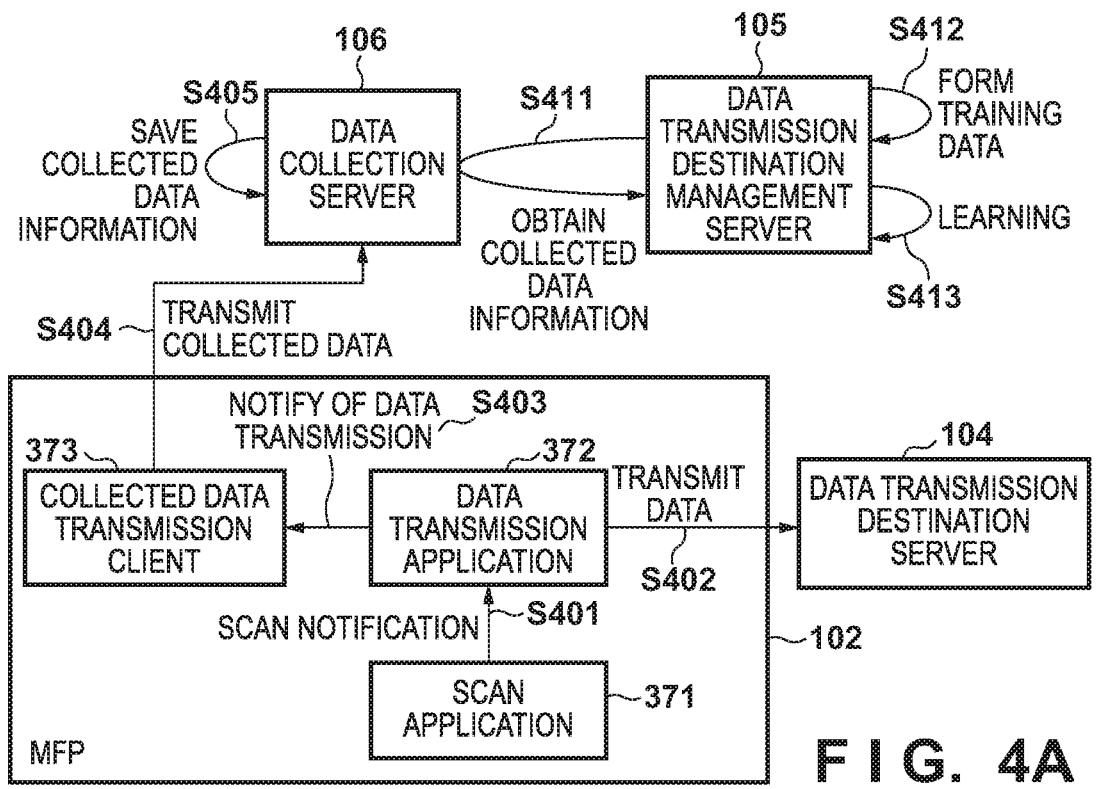
FIGS. 4A and 4B are views showing the overall sequence of data transmission according to the embodiment of the present invention.
Figure 4B:
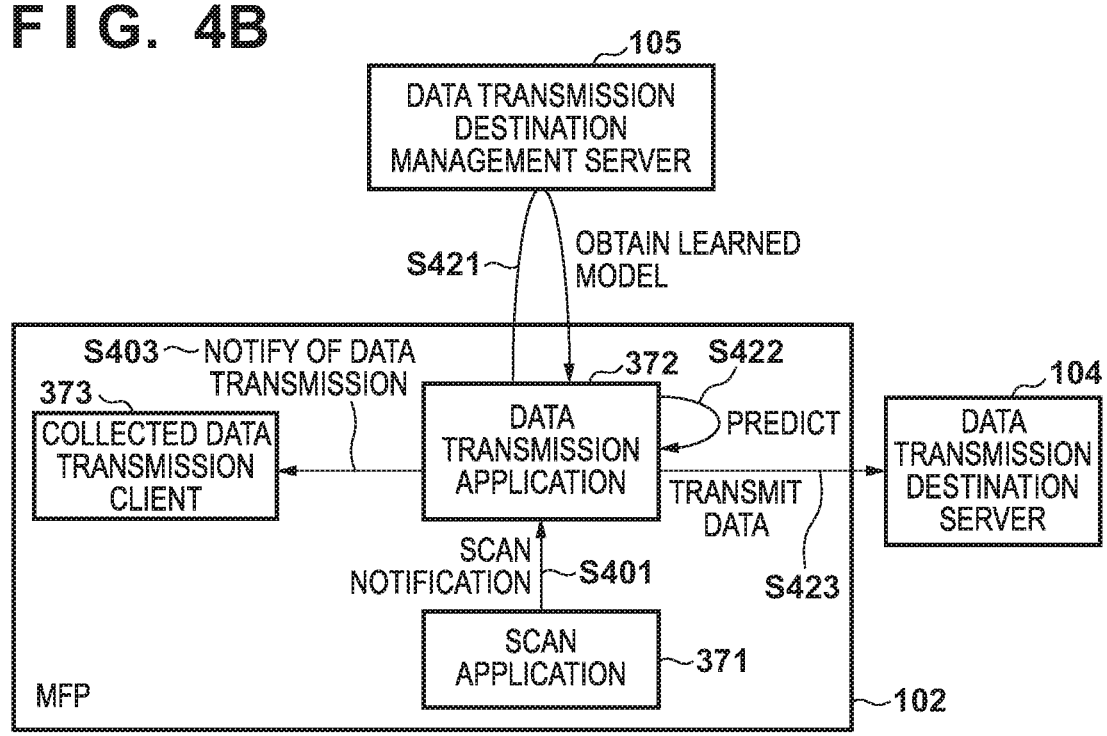

FIGS. 4A and 4B show processing sequences according to this embodiment. With reference to FIGS. 4A and 4B, procedures of accumulating transmission information of scanned image data as training data, forming a learned model by performing machine learning, and predicting the transmission destination of the image data by using the formed learned model will be explained below.

(Data Collection and Learning)

FIG. 4A shows a procedure by which information obtained by the MFP 102 by scanning image data and transmitting the data is saved as collected data in the data collection server 106, and the data transmission destination management server 105 performs machine learning by using the collected data and generates a learned model.

In step S401, the data transmission application 372 receives notification of scan execution from the scan application 371. Note that this step may also be executed by designating the data transmission application 372 from the operation panel 207.

In step S402, the data transmission application 372 transmits image data generated by the scan application 371 by executing scan to the data transmission destination server 104. The data transmission application 372 accepts designation of a transmission destination from the user via the operation panel 207, determines the transmission destination, and transmits the image data to the transmission destination.

In step S403, the data transmission application 372 notifies the collected data transmission client 373 that data transmission to the data transmission destination server 104 is executed.

In step S404, the collected data transmission client 373 sends, as collected data, information indicating the execution of data transmission to the data collection server 106. In this step, as described previously, it is also possible to delete or mask the information obtained by scan by the scan application 371 as needed, and transmit the resultant information as collected data.

In step S405, the data collection server 106 saves the collected data received from the collected data transmission client 373 of the MFP 102.

Table 1 shows an example of the collected data according to this embodiment. The collected data includes, for example, the transmission date/time, transmission destination information, transmission source information, execution user information, image data, and device information. The transmission destination information is information of the data transmission destination server 104 as the transmission destination of data in step S402, and is information having a mail address format or a URL (Uniform Resource Locator) format. The transmission source information is information indicating the MFP 102, and is information such as the IP address or the device ID. The execution user information is information of the user having transmitted data on the MFP 102. The image data is image data generated by the MFP 102, and equivalent to the image data transmitted in step S402. The device information is apparatus information such as the device ID or the MAC address, or application information such as scan setting.

TABLE 1

| Date/time | Transmission Destination | Transmission Source | Execution User | Image Data | Device ID | ... |
|---|---|---|---|---|---|---|
| 2018 Jan. 1 09:00:00.000 | aaa@example.com | 192.168.0.1 | User X | *** | ZZZ0001 | ... |
| 2018 Jan. 1 09:30:00.000 | bbb@example.com | 192.168.0.2 | User Y | *** | ZZZ0002 | ... |
| 2018 Jan. 1 09:40:00.000 | aaa@example.com | 192.168.0.1 | User Y | *** | ZZZ0001 | ... |
| ... | ... | ... | ... | ... | ... | ... |

In step S411, the data transmission destination management server 105 issues a collected data information obtaining request to the data collection server 106. In this step, the data transmission destination management server 105 can make the request by giving a condition to data to be obtained. As an example of the condition for this request, it is possible to request only the difference from previously obtained data, of the collected data held by the data collection server 106. The data collection server 106 returns a part or the whole of the collected data saved in step S405 to the data transmission destination management server 105. The amount of data obtained by the data transmission destination management server 105 in this step is equal to the amount of information to be used when performing machine learning. Therefore, as the data amount increases, the prediction accuracy increases.

In step S412, the data transmission destination management server 105 extracts elements to be used in learning, and an element to be handled as a learning result, from the collected data obtained from the data collection server 106. In this step, a group of the elements to be used in learning is regarded as input data, the element to be handled as a learning result is regarded as ground truth data, and a group of these pieces of information is regarded as training data. That is, the training data contains a plurality of data each having a pair of the input data and the ground truth data.

Table 2 shows examples of the training data extracted from the collected data. Of the collected data in this embodiment, the ground truth data is transmission destination information, and the input data contains image data, transmission source information, and time. In other words, the input data contains items other than the transmission destination information to be used as the ground truth data.

TABLE 2

| | Input Data | | |
|---|---|---|---|
| Ground Truth Data | Image Data | Transmission Source | Time |
| aaa@example.com | *** | 192.168.0.1 | 2018 Jan. 1 9:00:00.000 |
| bbb@example.com | *** | 192.168.0.2 | 2018 Jan. 1 9:30:00.000 |
| aaa@example.com | *** | 192.168.0.1 | 2018 Jan. 1 9:40:00.000 |
| ... | ... | ... | ... |

In step S413, the data transmission destination management server 105 performs learning on a learning model by using the training data formed in step S412, thereby forming a learned model. The generation of the learned model will be described later.

Note that the data transmission destination management server 105 can also form a learned model for each device ID, define groups to which devices belong, and perform control for each group. Accordingly, the number of learned models to be generated is not limited to 1, and it is possible to generate and manage a plurality of learned models.

(Transmission Destination Prediction and Data Transmission)

FIG. 4B shows a procedure by which the image data generated by the MFP 102 and the information of the MFP 102 are input, a transmission destination is predicted by using the learned model, and data transmission is performed. Note that the same reference numerals as in FIG. 4A denote the same processes as explained in FIG. 4A, and a detailed explanation thereof will be omitted.

After the scan notification in step S401, the process advances to step S421, and the data transmission application 372 obtains the learned model from the data transmission destination management server 105. The data transmission destination management server 105 may also control a learned model to be returned, in accordance with the device (MFP 102) having requested obtaining of the learned model. In this case, the data transmission application 372 transmits information indicating the MFP 102 and the like together with the request.

In step S422, the data transmission application 372 inputs the scanned image data, the present date/time, and the information of the MFP 102, as input data, to the learned model obtained in step S421, and outputs the transmission destination prediction result. The prediction process will be described later.

In step S423, the data transmission application 372 displays the predicted transmission destination on the operation panel 207, and accepts a data transmission instruction. Based on the accepted instruction, the data transmission application 372 transmits the data to the designated transmission destination. After that, the processing in step S403 is performed. From step S403, the procedure explained in FIG. 4A is performed, and the transmission data are accumulated in the data collection server 106.

Note that in this embodiment, the data transmission application 372 performs prediction by using the learned model. However, the data transmission destination management server 105 can also predict the transmission destination. In this case, the data transmission application 372 does not issue the learned model obtaining request to the data transmission destination management server 105, but sends the image data and the information of the MFP 102 as a prediction request. Then, the data transmission destination management server 105 receives the information contained in the obtained prediction request as input data, performs a transmission destination prediction process by using the held learned model, and returns the prediction result to the MFP 102 as the request source.

(Learned Model Generation Process)

Figure 5:
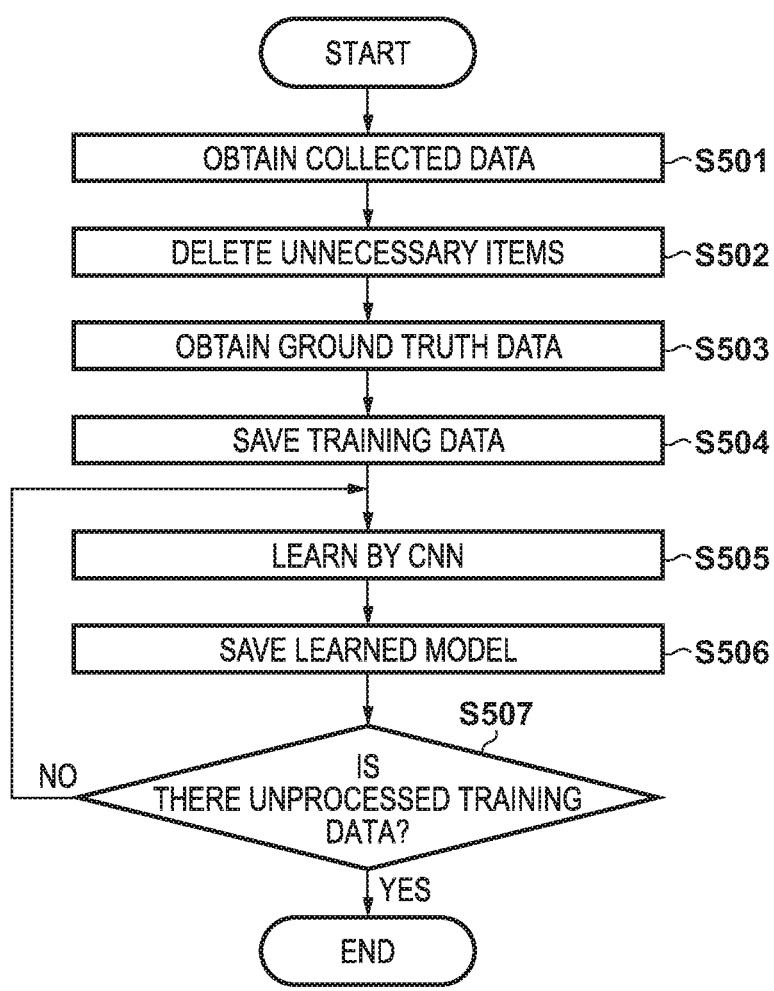
FIG. 5 is a flowchart of pre-processing and a learning process for collected data according to the embodiment of the present invention.

FIG. 5 is a flowchart of learned model formation in the data transmission destination management server 105 according to this embodiment. This procedure is implemented by the CPU 220 and the GPU 221 of the information processing apparatus that functions as the data transmission destination management server 105 by reading out a program stored in the storage device 226 or the like and executing the readout program.

In step S501, the training data management module 300 of the data transmission destination management server 105 obtains collected data from the data collection server 106.

In step S502, the training data management module 300 generates input data by deleting unnecessary items from the collected data obtained in step S501. In the case of the example shown in Table 2, the image data, the transmission source information, and the time information are extracted as the input data from the collected data.

In step S503, the training data management module 300 obtains the ground truth data item from the collected data obtained in step S501. In the case of the example shown in Table 2, the transmission destination information is extracted as the ground truth data from the collected data.

In step S504, the learning model management module 300 saves the input data generated in step S502 and the ground truth data obtained in step S503 in association with each other as training data. A practical example of the saved data is the data shown in Table 2.

In step S505, the learning model management module 301 performs learning of the training data by using a convolutional neural network, thereby forming a learning model.

In step S506, the learning model management module 301 saves the formed learning model.

In step S507, the learning model management module 301 determines whether learning of the whole training data is complete. If there is unprocessed data (NO in step S507), the process returns to step S505, and the unprocessed data is processed. If learning using the whole data is complete (YES in step S507), the process is terminated.

[Learning]

A classification method that is performed by predicting quantitative data by using a convolutional neural network as the basic algorithm of deep learning to be used in prediction and learning according to this embodiment will be explained below. Note that the present invention is not limited to this algorithm, and another algorithm such as a feedforward neural network may also be used. It is also possible to use different algorithms for the image data, the transmission destination information, and the time data.

A neural network is expressed by a mathematical model by imitating nerve cells (neurons) in the brain of a human and a neural network as a network for transmitting signals. A convolutional neural network is one neural network structure, and is a method of performing an arithmetic operation on a multi-dimensional array. The convolutional neural network is presumably effective for image recognition and the like.

Figure 6A:
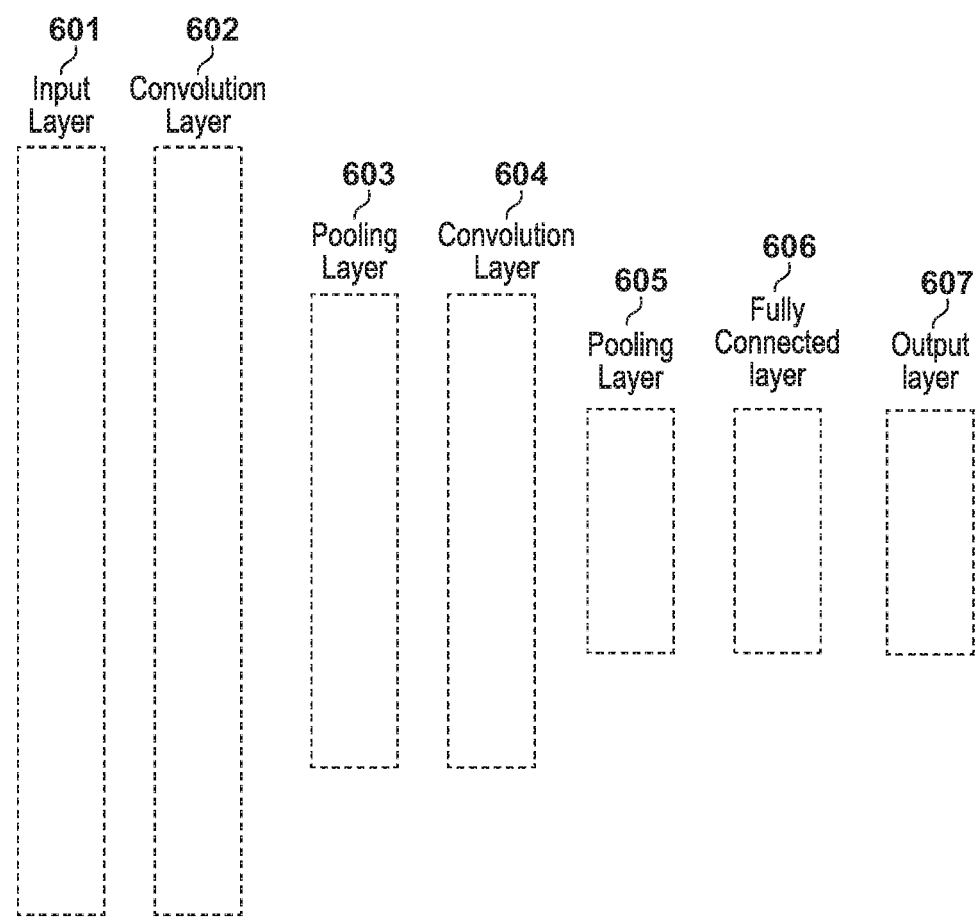
FIGS. 6A and 6B are views for explaining a convolutional neural network.

FIG. 6A shows an example of an outline of the processing of the convolutional neural network. The convolutional neural network is represented by a plurality of layer structures, and each layer performs processing to be described below. An input layer 601 accepts training data, and shapes the data as needed. For example, when image data is input, the input layer 601 converts the image data into a two-dimensional array of pixels. If the image data is a color image, the input layer 601 divides the data into three two-dimensional arrays of RGB (Red, Green, and Blue). Convolution layers 602 and 604 extract feature amounts by applying filters to the input data. Filters herein mentioned are data sets for extracting features of the input data, and one filter extracts one feature amount. Pooling layers 603 and 605 shrink the output results from the convolution layers 602 and 604. A fully connected layer 606 calculates a total feature map by using all values of the input data. An output layer 607 performs prediction on the input data and outputs the result.

In the convolutional neural network as shown in FIG. 6A, the accuracy of the feature amount is increased by executing the processes of the convolution layers and the pooling layers a plurality of times. Note that the process of the pooling layers may also be omitted. When the convolution process is executed N times by using X filters, the number of outputs is $X^N$, so the fully connected layer 606 calculates a feature amount by using all the $X^N$ outputs. In FIG. 6A, the processes of the convolution layers and the pooling layers are performed twice. However, these processes may also be performed a larger number of times.

Figure 6B:
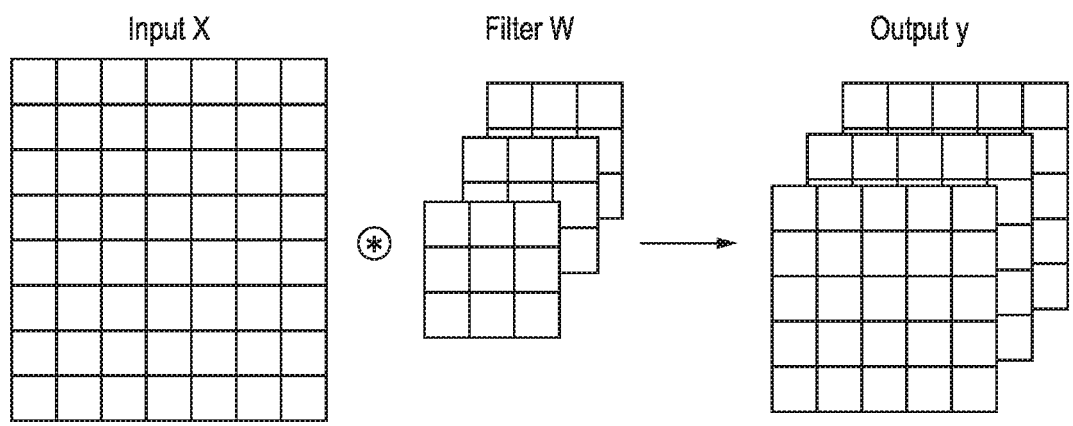

FIG. 6B is a view showing an outline of the process of the convolution layer (the convolution layers 602 and 604) according to this embodiment. The convolution layer performs a product-sum operation on an input X by using a filter W, and outputs an output y. Both the input X and the filter W are represented by two-dimensional arrays. The product-sum operation is an arithmetic operation of multiplying corresponding elements in arrays while sliding the filter W at a predetermined interval with respect to the input X, and calculating the sum of the multiplication results.

In the convolution layer, a weight defined for each filter can also be given to the calculation result. This weight is calculated by using a loss function. The loss function is a function of measuring the difference between the ground truth data and the prediction result of the output layer 607, and calculating the degree of matching. In the convolutional neural network, an error backpropagation method is known as a weight calculation method. In this method, the ground truth data is input to the output layer 607, and propagated back to the input layer 601. Note that the loss function is not limited to the above function, and may also be another function.

FIG. 7A shows input data 701 as an example of the input X value. FIG. 7B shows a filter 702 as an example of the filter W. FIG. 7C shows output data 703 as an example of the output y. The input data 701 shown in FIG. 7A represents the image data shown in Table 2 as a two-dimensional array of pixels. In this embodiment, a two-dimensional array including rows of the transmission source and the time is used as the input X. Note that not all input data need to be predicted by using the convolutional neural network, and it is also possible to perform prediction by using another algorithm such as the feedforward neural network in accordance with the type of input data. In this case, a processing part such as the fully connected layer 606 forms a predicted value by connecting the prediction results of all data.

The filter W shown in FIG. 7B is a Sobel filter that is generally used to detect an edge in the longitudinal direction. The convolutional neural network generally forms a plurality of outputs by preparing a plurality of filters W and calculating feature amounts by using them. Accordingly, the filter W is not limited to the filter shown in FIG. 7B, and may also be, for example, a Sobel filter for detecting an edge in the lateral direction, or an averaging filter to be used to reduce noise. It is also possible to use a feature amount calculated by the convolutional neural network.

FIG. 7C shows the result of calculation performed on the input data 701 shown in FIG. 7A by using the filter 702 shown in FIG. 7B by setting slide=1. "Slide" indicates the sliding amount of a filter when applying it.

The convolution layer can determine how to activate the output y and transfer the output y to the next layer by using an activation function on the output y. In this embodiment, the activation is performed by using a ramp function called a rectified linear unit (to be referred to as an ReLU hereinafter). The ReLU is a function that outputs 0 if an input value is less than 0, and directly outputs an input value if the input value is 0 or more. The ReLU is a linear function having a constant slope except when x=0, and is a differentiable function. This function can cope with a vanishing gradient problem in which when performing learning by using an error backpropagation method or the like, the slope of the loss function becomes close to 0 and makes learning unable to perform. The ReLU function is particularly effective when the neural network layer is deep. Note that a function other than the ReLU function may also be used as the activation function. FIG. 7D shows an example of an activated output value 704 obtained by applying the ReLU function to the output data 703 shown in FIG. 7C.

Figure 8A:
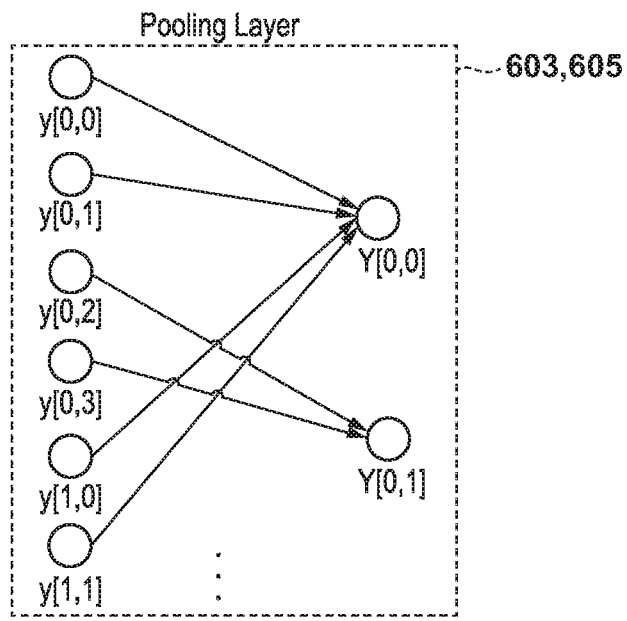
FIGS. 8A and 8B are views for explaining the operation of each layer of the convolutional neural network.

FIG. 8A is a view showing an outline of the processing of the pooling layer (the pooling layers 603 and 605) according to this embodiment. The pooling layer calculates a feature amount for an n*n region. In this embodiment, the calculation is performed by using a method called 2*2 max pooling. This method focuses on a range of 2*2 in a region of an array, and adopts a maximum value in the range. Assume that in the output value 704 shown in FIG. 7D, the input is y[M, N], M is the coordinate in the lateral direction, N is the coordinate in the longitudinal direction, and the upper left point is the origin [0, 0]. In this case, y[0, 0]=0, y[0, 1]=4, y[1, 0]=0, and y[1, 1]=4 hold. Since the maximum value is 4, the value of output Y[0, 0] is 4. Other values are calculated in the same manner. Note that the pooling method is not limited to max pooling, and another calculation may also be used. FIG. 7E shows an example of a value obtained by pooling.

Figure 8B:
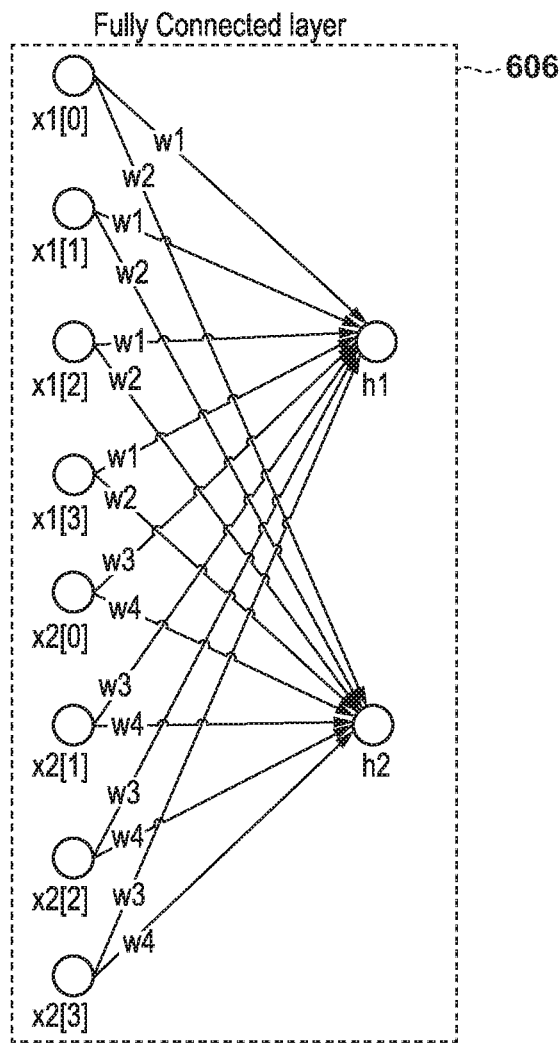

FIG. 8B is a view showing an outline of the process of full connection by the fully connected layer 606 according to this embodiment. Since the convolution layer extracts one feature by one filter, $N^M$ two-dimensional arrays are input when performing the convolution process M times by using N filters. The fully connected layer 606 replaces all the input two-dimensional arrays with one-dimensional arrays, and performs a vector calculation.

In FIG. 8B, two-dimensional arrays x1 and x2 are replaced with one-dimensional arrays x1[ ] and x2[ ], and all of x1[0] to x1[3] and x2[0] to x2[3] are weighted and connected, thereby calculating an output h. A weight w can be prepared for either each two-dimensional array or each node.

Finally, an error between the output h obtained as described above and the ground truth data is calculated, and the weight w is adjusted in accordance with the error. In the convolutional neural network, an algorithm called an error backpropagation method can be used to adjust the weight w. The error backpropagation method is a method that obtains a minimum value by changing the weight so as to change the gradient of an error to the negative direction by using a method called a gradient descent method in the output layer 607 shown in FIG. 6A, and performs a calculation while propagating this gradient calculation back to the preceding layer. The weight w that minimizes the error between the output h and the ground truth data is obtained by using this method.

By using the above method, the learning model management module 301 learns a data transmission destination from collected data obtained by the data collection server 106. A learning model whose parameters are adjusted by this learning is called a learned model. The learned model operates as a function that approximates the data pattern of the output h with respect to the input data, and can predict the result. The learned model is saved in step S506 of FIG. 5. A generated learning model is used as the data transmission destination prediction method according to this embodiment.

(Prediction Process)

Figure 9:
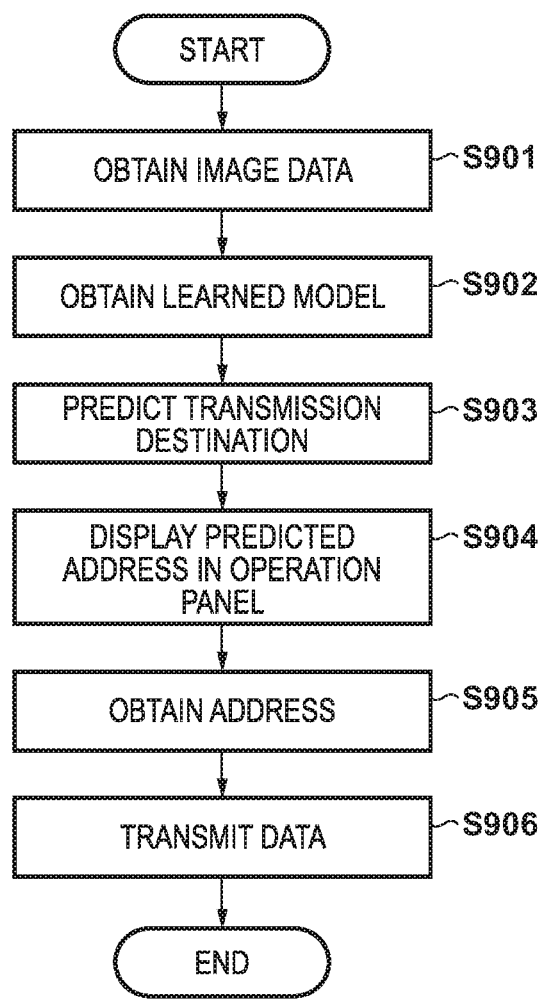
FIG. 9 is a flowchart of a data transmission destination prediction process according to the embodiment of the present invention.

FIG. 9 shows the procedure of the data transmission destination prediction process in the MFP 102 according to this embodiment. This procedure is implemented by the CPU 201 or the GPU 202 of the MFP 102 by reading out a program stored fin the storage device 208 or the like and executing the readout program.

In step S901, the data transmission application 372 obtains image data from the scan application 371. This step can be executed by notification from the scan application 371, and can also be executed by designating the data transmission application 372 from the operation panel 207.

In step S902, the data transmission application 372 obtains a learned model from the data transmission destination management server 105. In this step, a learned model obtaining request is transmitted to the data transmission destination management server 105. Note that the obtaining of a learned model is not limited to this timing, and the obtaining request may also be transmitted at a predetermined timing.

In step S903, the data transmission application 372 performs prediction on the learned model obtained in step S902, by using the image data, the present time, and the IP address information (transmission source information) of the MFP 102 as input data. That is, this input data contains the same items as those of the input data of the training data shown in Table 2. In this embodiment, prediction using the convolutional neural network is performed. In the convolutional neural network, processing is performed by using information to be predicted with respect to a learned model as input data, and the output layer outputs the prediction result. In this embodiment, the transmission destination information is the prediction result, and the prediction result is the same as the item of the ground truth data of the training data shown in Table 2.

In step S904, the data transmission application 372 displays the transmission destination of the prediction result on the operation panel 207. In this step, the data transmission application 372 converts the prediction result obtained in step S903 into actual transmission destination information, and displays this information. The data transmission application 372 can also display a transmission destination input screen (not shown).

In step S905, the data transmission application 372 obtains information of the data transmission destination. In this step, information of the designated data transmission destination is obtained based on an instruction by a user's operation.

In step S906, the data transmission application 372 transmits the data to the obtained data transmission destination. Then, this procedure is terminated.

[Screen Transition]

Figure 10A:
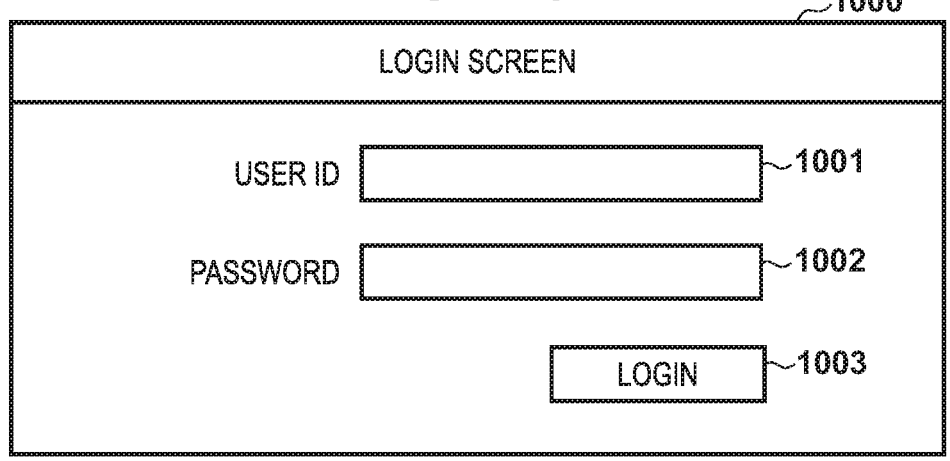
FIGS. 10A to 10C are views showing screen arrangement examples according to the embodiment of the present invention.
Figure 10B:
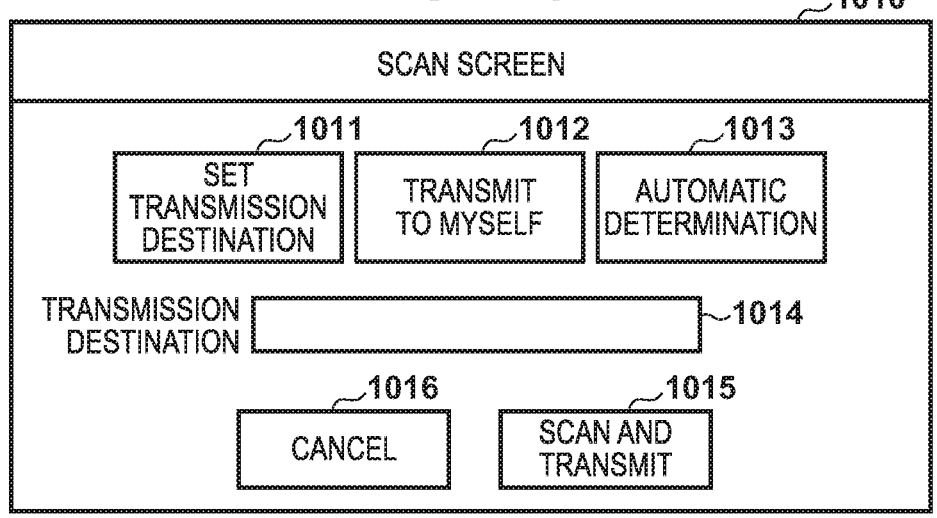
Figure 10C:
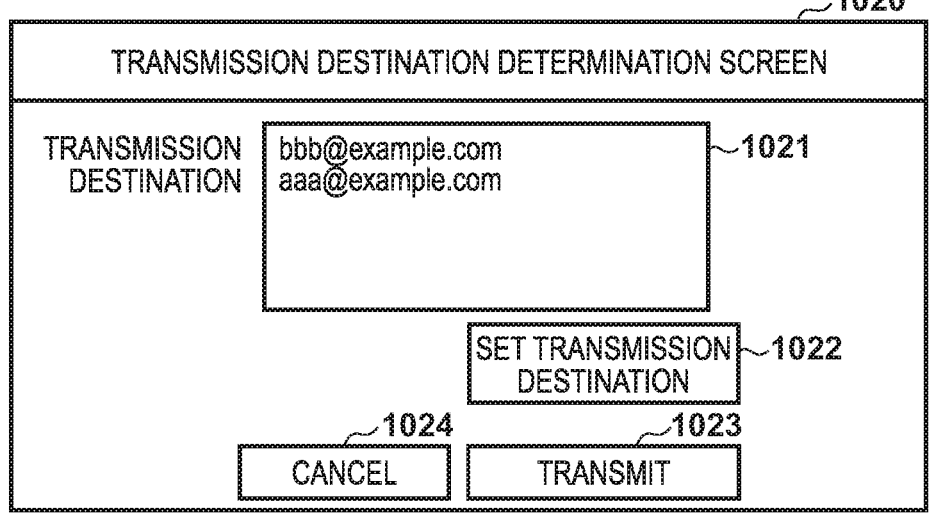

FIGS. 10A to 10C are views for explaining screen transition when the MFP 102 performs data transmission according to this embodiment. These screens shown in FIGS. 10A to 10C are displayed on, for example, the operation panel 207.

FIG. 10A shows an arrangement example of a login screen 1000 for logging into the MFP 102. The login screen 1000 includes a user ID input text box 1001, a password input text box 1002, and a login button 1003. When the login button 1003 is pressed, user authentication is performed by using the input user ID and password, and, if the user authentication is successful, a function list screen or the like of the MFP 102 is displayed. In this embodiment, if the user authentication is successful, the display changes to a scan screen 1010 shown in FIG. 10B. Note that this embodiment shows an example of user authentication by manual input using the user ID and the password, but the present invention is not limited to this, and it is also possible to perform authentication by using another information such as biological information or by using another authentication method.

FIG. 10B shows an arrangement example of the scan screen 1010 to be provided by a data transmission application. The scan screen 1010 is displayed when the MFP 102 scans an image. The scan screen 1010 includes a set transmission destination button 1011, a transmit-to-myself button 1012, an automatic determination button 1013, a transmission destination display text box 1014, a scan-and-transmit button 1015, and a cancel button 1016.

When the set transmission destination button 1011 is pressed, a transmission destination input screen (not shown) is displayed, and a transmission destination is accepted. It is also possible to display a transmission destination list set in the login account (user ID) or in a group of the account, and accept the selection of a transmission destination from the transmission destination list. When the transmit-to-myself button 1012 is pressed, a mail address set in the login account is set as a transmission destination. When the automatic determination button 1013 is pressed, a transmission destination is predicted after scan.

When the scan-and-transmit button 1015 is pressed with a transmission destination being already set, scan is performed, and data is transmitted to the set transmission destination. If no transmission destination is set, the display changes to a transmission destination determination screen 1020 shown in FIG. 10C. When the cancel button 1016 is pressed, the scan function is terminated.

FIG. 10C shows an arrangement example of the transmission destination determination screen 1020 to be provided by a data transmission destination determination application. The transmission destination determination screen 1020 is a screen for displaying a transmission destination predicted from scanned image data, and predicted transmission destinations candidates are selectably presented. The transmission destination determination screen 1020 includes a transmission destination list 1021, a transmission destination set button 1022, a transmit button 1023, and a cancel button 1024. The transmission destination list 1021 displays a list of addresses predicted by the data transmission application 372. If a plurality of addresses are possible, the addresses are displayed in the form of a list in descending order of possibility, and a transmission destination is accepted. The possibility herein mentioned can be determined based on a value obtained from a learned model.

The transmission destination set button 1022 is used when there is no transmission target address in the predicted transmission destination, or when accepting input of a transmission destination. When the transmit button 1023 is pressed, image data is transmitted to the transmission destination selected from the transmission destination list 1021, or to the set transmission destination. When the cancel button 1024 is pressed, transmission is canceled, and the MFP 102 discards the scanned image data.

In this embodiment as described above, a transmission destination predicted by a data transmission application is used when transmitting scanned image data. This allows the user to perform data transmission more easily.

Second Embodiment

When performing data transmission in the above embodiment, the data transmission application 372 predicts a transmission destination and automatically sets or displays the transmission destination. However, this prediction information is the result of approximation of the pattern of training data extracted from data accumulated in the data collection server 106, so it is not always possible to predict transmission destinations desired by all users. In addition, a procedure that always transmits data to an address set for a user having logged in to the MFP 102 is possible depending on a user. It is thus possible that there is a user who does not want to perform or need not perform a prediction process.

As the second embodiment of the present invention, therefore, a method of holding the setting of valid or invalid of a transmission destination prediction function for each user and switching prediction processes will be explained. Note that the reference numerals and names in the drawings are the same as the first embodiment unless otherwise specified. Note also that an explanation of the same components as the first embodiment will be omitted.

Table 3 shows user setting information that a data transmission application 372 manages. The user setting information contains a user ID indicating the user, and a prediction flag indicating whether to use the transmission destination prediction function. The prediction function is used when the value of the prediction flag is "true", and is not used when the value is "false". This user setting information can freely be set by the user on a setting screen (not shown). The user ID is an identifier for uniquely identifying the user when performing a scan process and a data transmission process. The user herein mentioned is, for example, a user who is going to log in to the MFP 102.

TABLE 3

| User ID | PredictionFlag | ... |
|---------|----------------|-----|
| user A  | false          | ... |
| user B  | true           | ... |
| ...     | ...            | ... |

(Prediction Process)

Figure 11:
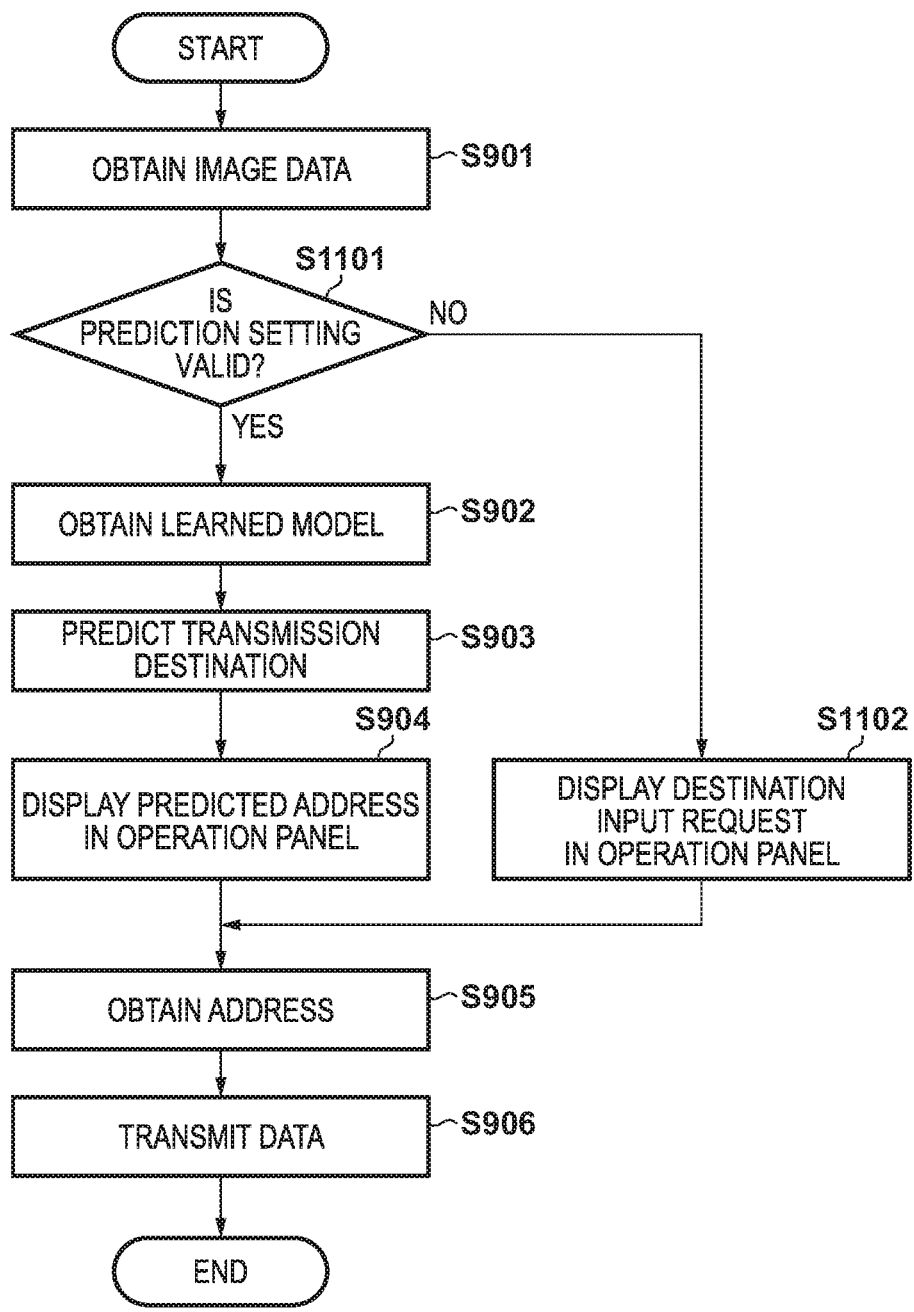
FIG. 11 is a flowchart of a data transmission destination prediction process according to the second embodiment.

FIG. 11 shows the procedure of the data transmission destination prediction process in the MFP 102 according to this embodiment. This procedure corresponds to the procedure shown in FIG. 9 described in the first embodiment.

Afterimage data is obtained in step S901, the process advances to step S1101, and the data transmission application 372 checks a user's prediction flag based on the user ID, and determines whether to use the transmission destination prediction function. If the prediction setting is valid (true) (YES in step S1101), the process advances to step S1102, and the prediction process is performed. If the prediction setting is invalid (false) (NO in step S1101), the process advances to step S902.

In step S1102, the data transmission application 372 displays a transmission destination input screen (not shown) on the operation panel 207. Then, the process advances to step S905.

In this embodiment as described above, it is possible to switch whether to use the data transmission destination prediction function for each user, in addition to the effect of the first embodiment.

Third Embodiment

In the above embodiments, prediction is performed based on information obtained when the MFP 102 transmits data to the data transmission destination server 104. On the other hand, there is a case in which the MFP 102 does not directly transmit data to the data transmission destination server 104, but transmits data via another terminal. For example, the MFP 102 transmits data (for example, image data) to a mail address set for the login user. After that, the user receives data from the MFP 102 and transmits the data to the data transmission destination server 104 by using a mail application 380 at the terminal 103. A procedure like this is effective when the mail application 380 of the terminal 103 manages data transmission destination information.

As the third embodiment of the present invention, a form in which when transmitting data from an MFP 102 to a data transmission destination server 104 via a terminal 103, data transmission destinations are accumulated in a data collection server 106, and a data transmission application 372 performs prediction, will be explained. That is, the MFP 102 functions as a data generation apparatus for generating image data, and the terminal 103 functions as a data transmission apparatus for transmitting the image data generated by the MFP 102 to a predetermined transmission destination. Note that the reference numerals and the names in the drawings are the same as the first embodiment unless otherwise specified. Note also that an explanation of the same components as the first embodiment will be omitted.

[Processing Sequence]

Figure 12:
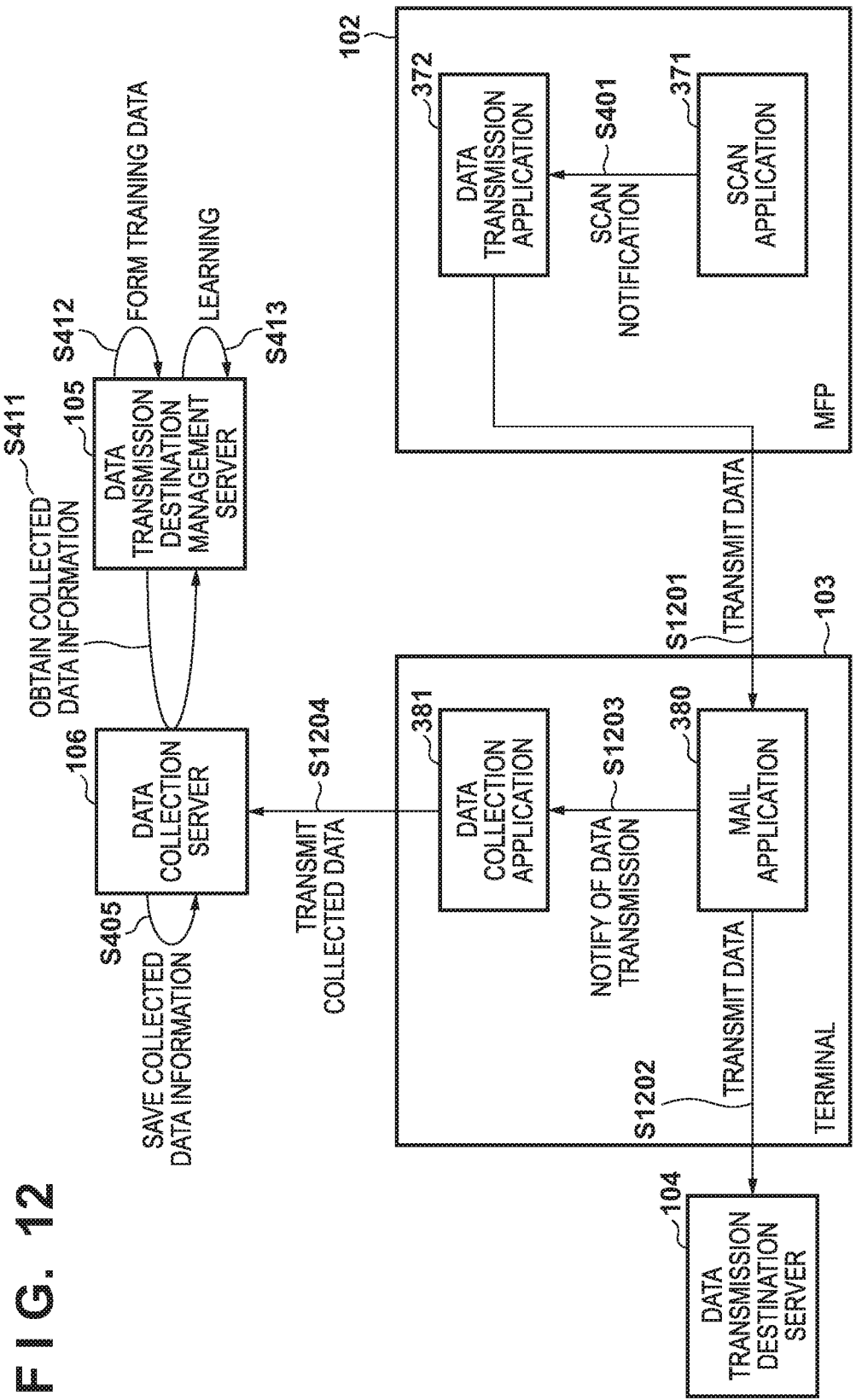
FIG. 12 is a view showing the overall sequence of data transmission according to the third embodiment.

FIG. 12 shows a processing sequence according to this embodiment. This processing sequence is executed in place of or in addition to the sequence shown in FIG. 4A described in the first embodiment.

After scan notification in step S401, the process advances to step S1201, and the data transmission application 372 transmits data to the terminal 103. For example, the data transmission application 372 uses a mail address set for the login user (user ID) of the MFP 102 as an address, and transmits mail by attaching image data. In this step, it is also possible to give the mail the IP address or the client ID of the MFP 102 as MFP information.

In step S1202, the mail application 380 transmits data to the data transmission destination server 104. In this step, the mail application 380 receives the mail transmitted in step S1201, and obtains the image data attached to the received mail. Then, the mail application 380 transmits the mail to which the image data is attached, to the address of the data transmission destination server 104 designated by the mail application 380.

In step S1203, the mail application 380 notifies a data collection application 381 of the data transmission. The data collection application 381 can also be configured as an extended function of the mail application 380. It is also possible to cause the data collection application 381 to monitor and detect data transmission.

In step S1204, the data collection application 381 transmits the collected data to the data collection server 106. In this step, the data collection application 381 sets the information of the MFP 102, or the mail address of the mail received by the mail application 380, as data transmission source information. As the information of the MFP 102, it is possible to use the information transmitted in step S1201, or a value designated in the data collection application 381 beforehand. Processing after that is the same as the processing described with reference to FIG. 4A of the first embodiment.

In this embodiment as described above, even when performing the procedure by which image data scanned by the MFP 102 is transmitted to its own address, received by the terminal 103, and transferred to the data transmission destination server 104, the address information of the transfer can be accumulated in the data collection server 106. When the MFP 102 forms image data, therefore, an address transmitted from the terminal 103 in the past can be predicted as the transmission destination.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072166, filed on Apr. 4, 2019, which is hereby incorporated by reference herein in its entirety.

What is claimed is:

1. An information processing apparatus comprising:
   at least one processor; and
   at least one memory comprising at least one program,
      wherein the at least one program is configured to cause the at least one processor to perform:
   transmitting data;
   providing, when data transmission is performed in the transmitting, an external apparatus with transmission information of the data transmission as collected data;
   executing a prediction process of predicting a candidate of a data transmission destination;

presenting the candidate of the data transmission destination predicted by in the executing; and displaying a screen including a transmission destination button, a transmit-to-myself button, an automatic determination button, a transmission-destination-display-box, and a scan-and-transmit button, wherein the prediction process is performed by using a learning model generated by machine learning performed based on training data generated from collected data accumulated in the external apparatus, the training data including a pair of ground truth data containing transmission destination information, and input data containing an item other than the transmission destination information, and wherein a transmission destination input by a user is set in the transmission-destination-display-box when the transmission destination button is depressed, an address set in the login account is set as the transmission destination in the transmission-destination-display-box when the transmit-to-myself button is depressed, the data transmission destination is predicted by the prediction process after data to be transmitted is scanned when the automatic determination button is depressed, data is scanned and transmitted to the transmission destination being already set in the transmission-destination-display-box when the scan-and-transmit button is depressed with the transmission destination being already set in the transmission-destination-display-box, and the data transmission destination is predicted by the prediction process after data to be transmitted is scanned when the scan-and-transmit button is depressed with no transmission destination being set in the transmission-destination-display-box.

2. The apparatus according to claim 1, wherein the at least one program is further configured to cause the at least one processor to perform holding, for each user, setting information indicating whether to perform the prediction process, and execution of the prediction process is controlled for each user in the executing.

3. The apparatus according to claim 1, wherein, in the executing, the learning model is obtained from the external apparatus, and a candidate of a data transmission destination is predicted by using the learning model.

4. The apparatus according to claim 1, wherein, in the executing, a request is transmitted to the external apparatus by including information of an item used as the input data in the external apparatus, and a prediction result of a candidate of a data transmission destination is received as a response to the request.

5. The apparatus according to claim 1, wherein, in the executing, information obtained by deleting predetermined attribute information from information used in data transmission in the transmitting is provided as collected data.

6. The apparatus according to claim 1, wherein
the information processing apparatus is an image formation apparatus, and
the image formation apparatus generates image data as the data by a scan process.

7. A data transmission destination prediction method comprising:
transmitting data;
providing, when data transmission is performed by the transmitting, an external apparatus with transmission information of the data transmission as collected data;

executing a prediction process of predicting a candidate of a data transmission destination;

presenting the candidate of the data transmission destination predicted in the executing a prediction process; and displaying a screen including a transmission destination button, a transmit-to- myself button, an automatic determination button, a transmission-destination-display-box, and a scan-and-transmit button, wherein the executing a prediction process is performed by using a learning model generated by machine learning performed based on training data generated by using the collected data accumulated in the external apparatus, the training data including a pair of ground truth data containing transmission destination information, and input data containing an item other than the transmission destination information, and wherein a transmission destination input by a user is set in the transmission-destination-display-box when the transmission destination button is depressed, an address set in the login account is set as the transmission destination in the transmission-destination-display-box when the transmit-to-myself button is depressed, the data transmission destination is predicted by the prediction process after data to be transmitted is scanned when the automatic determination button is depressed, data is scanned and transmitted to the transmission destination being already set in the transmission-destination-display-box when the scan-and-transmit button is depressed with the transmission destination being already set in the transmission-destination-display-box, and the data transmission destination is predicted by the prediction process after data to be transmitted is scanned when the scan-and-transmit button is depressed with no transmission destination being set in the transmission-destination-display-box.

8. A non-transitory computer-readable storage medium storing a program for causing a computer, when the program is executed by the computer, to execute:
transmitting data;
providing, when data transmission is performed by the transmitting, an external apparatus with transmission information of the data transmission as collected data;

executing a prediction process of predicting a candidate of a data transmission destination;

presenting the candidate of the data transmission destination predicted in the executing a prediction process; and displaying a screen including a transmission destination button, a transmit-to-myself button, an automatic determination button, a transmission-destination-display-box, and a scan-and-transmit button, wherein the executing a prediction process is performed by using a learning model generated by machine learning performed based on training data generated by using the collected data accumulated in the external apparatus, the training data including a pair of ground truth data containing transmission destination information, and input data containing an item other than the transmission destination information, and wherein
a transmission destination is input by a user is set in the transmission-destination-display-box when the transmission destination button is depressed,
an address set in the login account is set as the transmission destination in the transmission-destination-display-box when the transmit-to-myself button is depressed, the data transmission destination is predicted by the prediction process after data to be transmitted is scanned when the automatic determination button is depressed,
data is scanned and transmitted to the transmission destination being already set in the transmission-destination-display-box when the scan-and-transmit button is depressed with the transmission destination being already set in the transmission-destination-display-box, and
the data transmission destination is predicted by the prediction process after data to be transmitted is scanned when the scan-and-transmit button is depressed with no transmission destination being set in the transmission-destination-display-box.

* * * * *